Sept. 2, 1941.   F. C. HARRIS ET AL   2,254,285
AUTOMATIC CONTROL FOR MONORAIL SYSTEMS
Filed April 12, 1939
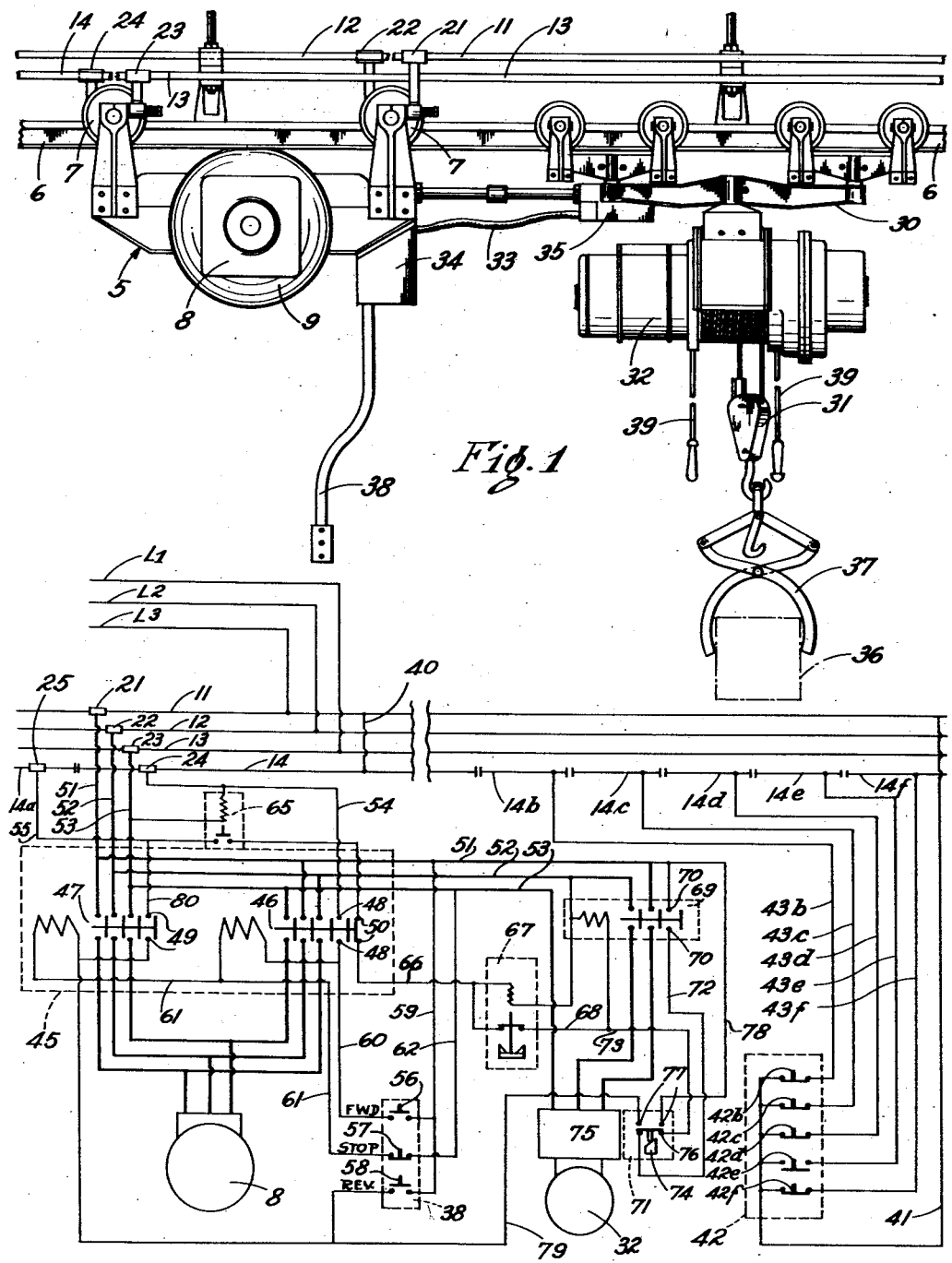
INVENTORS
FRANK C. HARRIS
& CARROL DE V. MILLER
BY
Richey Watts
ATTORNEYS Patented Sept. 2, 1941

2,254,285

UNITED STATES PATENT OFFICE 2,254,285

AUTOMATIC CONTROL FOR MONORAIL SYSTEMS

Frank C. Harris and Carrol deV. Miller, Lakewood, Ohio, assignors to The American Mono Rail Company, Cleveland, Ohio, a corporation of Ohio Application April 12, 1939, Serial No. 267,444

9 Claims. (Cl. 212—132)

This invention relates to selective automatic controls for overhead conveyors such as electrified overhead rail runways or monorail systems. In the operation of such conveyor systems it frequently is desirable for an operator at a loading platform, for example, to be able to pick up a load on a hoist supported by a carrier or trolley, then to dispatch it to a selected station or destination remote from the loading platform where the trolley will automatically stop at a preselected station. In addition, it is often desirable to have the trolley automatically deposit its load at the selected destination and then automatically return to the starting point or loading platform. Various other similar operations are frequently advantageous, such as to load a container supported by a trolley with a batch of materials, dispatch the loaded container to a selected one of a number of mixing tanks, have the trolley stop at the selected tank where the contents of the container are discharged and then return to the starting point for another charge.

It is therefore among the objects of my invention to provide a control system adapted to carry out the operations noted above. Another object is to provide a simple and efficient system whereby a carrier or trolley may be dispatched to and automatically stopped at a selected destination. Another object is to provide a system whereby a carrier or trolley may be sent to a selected station where it will automatically carry out a desired operation, and thereafter automatically return to the starting point. A further object is to provide a simple and reliable system of this character which can be economically constructed. Another object is to provide such a system in which the various operations are all carried out by electrically operated mechanisms and controls.

Further objects and advantages of my invention will become apparent from the following description of a preferred form thereof reference being made to the accompanying drawing. The essential characteristics are summarized in the claims.

In the drawing, Figure 1 illustrates somewhat diagrammatically one type of conveyor apparatus embodying my invention; and Figure 2 is a wiring diagram illustrating a preferred arrangement of electrical circuits for carrying out the automatic operation of the apparatus.

As shown in Figure 1 my invention may be adapted to an overhead conveyor of a well known type including a motor driven trolley or tractor indicated generally at 5 and supported from the track 6 by wheels 7. The trolley 5 is propelled along the track by an electric motor 8 driving a wheel 9 engaging the under side of the track. Electric power is preferably supplied to the motor 8 from rigid conductor bus bars 11, 12 and 13 engaged by collector shoes 21, 22 and 23, the system illustrated being designed for three phase alternating current. The control circuit is completed by bus bar 14 engaged by collector shoes 24 and 25.

The tractor 5 is coupled to a trolley or carrier 30, the function of the tractor being to propel the carrier 30 along the track. The carrier may support an auxiliary mechanism such as the hoist 31 operated by motor 32, the power being supplied through the cable 33 connected to the control box 34 of the tractor 5 and leading to the controller 35 for the hoist. The hoist may be arranged, for example, to support a load 36 by a grab 37 arranged so that when the load is deposited on the floor, the grab 37 will be automatically released therefrom. The controller 35 may embody reversing switches, limit switches or controls (not shown) of any well known type, so that the hoist will automatically go through a cycle of operations consisting of lowering a load, disengaging the load from the grab, and hoisting the grab to its normal raised position. The tractor and hoist are also preferably provided with manual controls, such as the push button control 38 and the pull cords 39, respectively.

Figure 2 illustrates a preferred electrical circuit whereby the tractor may be sent to a selected destination, the hoist operated to discharge its load, and the tractor returned to the starting point. As shown therein the bus bars 11, 12 and 13 are supplied with power from the supply lines $L_1$, $L_2$ and $L_3$, respectively. The control bus bar 14 is energized by conductor 40 extending between bus bars 11 and 14. Adjacent the loading or dispatching station there is a section 14a of the control bus bar which is not energized, being insulated from the remaining portion of the bus bar 14. Adjacent the several delivery stations or destinations the bus bar 14 is divided into a plurality of sections 14b, 14c, 14d, 14e and 14f each section being insulated from adjacent sections and from the main section 14. These insulated sections may be selectively energized through conductor 41, switch panel 42 including switches 42b, 42c, 42d, 42e and 42f and conductors 43b, 43c, 43d, 43e and 43f leading to the sections 14b, 14c, 14d, 14e and 14f, respectively. Thus by operation of the switches the insulated sections of the bus bar 14 can be selectively energized, and the circuits are so arranged that the driving motor 8 of the trolley 5 is stopped automatically when the trolley reaches a section of the bus bar which is not energized. Thereafter, in the embodiment shown, the auxiliary equipment automatically carries out its cycle of operations such as releasing a load, and upon completion of the cycle, the drive motor 8 is automatically operated in a reverse direction to return the tractor to its starting point where it automatically stops upon reaching the insulated section 14a. Those skilled in the art will appreciate, however, that the selective control of the desination can, if desired, be used advantageously without automatic control of the auxiliary equipment. Preferably the switch panel 42 is disposed adjacent the dispatching point, and obviously a greater or lesser number of stations may be provided.

The operation of the drive motor 8 for the tractor 5 is controlled by a magnetic reversing switch indicated generally at 45 and including a contactor 46 which when closed completes the circuits from the collector shoes 21, 22 and 23 and associated conductors 51, 52 and 53, respectively, to the terminals of the motor 8 for forward operation of the trolley and a contactor 47 which completes the circuits for the reverse operation of the trolley. In addition to the usual contacts for controlling the power supply to the motor the contactors 46 and 47 include contacts 48 and 49, respectively, for the holding circuits, and contactor 46 includes contacts 50 for controlling a circuit leading to the auxiliary equipment which will be described in detail below.

The energization of the magnetic switches 46 and 47 may be controlled through a push button control 38 including a forward control button 56, a reverse control button 58 and a stopping button 57. Depressing forward control button completes the circuit from conductor 51, through conductors 59 and 60, the coil of switch 46, conductor 61, the stop switch 57 which is normally closed, and conductor 62 to conductor 53. After the switch has been energized by depressing the button 56, the power circuits will remain closed as the coil is energized by current flowing from collector shoe 24 in contact with the energized section 14 of the control bus bar and through conductor 54 holding contacts 48, conductor 61, switch 57, and conductors 62 and 53.

It will be seen that by this arrangement the forward operation of the drive motor, started by depressing the button 56 momentarily, will continue as long as the shoe 24 remains in contact with an energized section of the control bus bar or until the stop button is depressed to break the holding circuit. Thus the circuit may be employed to stop the tractor automatically at a selected point, for if the operator opens the circuit leading to one of the insulated sections of the control bus bar, for example the section 14e, then the switch 46 will be de-energized when the collector shoe 24 reaches section 14e thereby opening the power supply circuits to the drive motor 8. At the same time the circuit including the contacts 50 will be closed. The no-current relay 65, controlled by current flowing between conductor 53 and 54, will also be de-energized to close the circuit therethrough when collector shoe 24 reaches the dead section 14e of the bus bar. Under these conditions current will flow through conductor 55, relay 65, contacts 50, conductor 66, the time delay no-current relay 67, conductor 68 and the coil of contactor 69, the circuit being completed through conductor 52. Contactor 69 closes the power circuits leading to the auxiliary equipment such as the motor of the hoist 31, and is maintained closed by its own holding circuit, the coil being connected across conductors 51 and 52 through the holding contacts 70, the switch 71 and conductors 72 and 73. The circuit through the contacts of the relay 67 is closed only momentarily, as the relay opens shortly after it is energized by the closing of the circuit leading thereto.

The motor of the hoist or other auxiliary equipment is provided with its own controls indicated generally at 75 which form no part of the present invention and which will not be illustrated herein. The controls 75 for a hoist, for example, may include reversing switches and limit switches to cause the hoist to go through a desired cycle of operations, and are provided with means such as the cam 74 to actuate the switch 71 at the end of the cycle of operation of the auxiliary equipment so as to momentarily open contacts 76 and momentarily close contacts 77. Breaking the circuit between contacts 76 opens the holding circuit of the contactor 69 thus opening the circuits leading to the auxiliary equipment. Closing the circuit including the contacts 77 energizes the reverse contactor 47 through conductors 78, 79 and 61 which are in parallel with the circuit including the reversing switch 52. The holding circuit of contactor 47 is energized through shoe 25 and conductors 55 and 80. Thus the tractor motor 8 will operate in a reverse direction to return the trolley towards its starting point until collector shoe 25 reaches the insulated section 14a of the control bus bar 14. The holding circuit will then be opened and the switch 47 will open and thus stop the tractor at its original starting point. Inasmuch as limit switch 71 operates to close the contacts 75 only momentarily at the start of the return trip, the contactor thereof will drop down again into engagement with the contacts 74 so that when the carrier reaches its starting point all of the various contactors will be in their original position and the trolley will be ready for another cycle of operations.

The no-current relay 65 is arranged so that if desired the apparatus can be stopped or started or reversed by the ordinary push button controls without causing the auxiliary equipment to go through its regular cycle of operation. It will be noted that the relay 65 is energized by current flow between conductors 53 and 54 associated with collector shoes 23 and 24 and bus bars 13 and 14, respectively. Thus as long as the collector shoe 24 is in engagement with an energized section of the bus bar 14 the circuit through the relay from collector shoe 25 to the contactor 67 will remain open, even though the apparatus is stopped and the switch 48 de-energized, thereby preventing automatic operation of the auxiliary equipment except when shoe 24 is in contact with a dead section of bus bar 14 and shoe 25 is in contact with an energized section thereof.

To summarize the operation, the operator can control the position of the apparatus on the track at any time by manipulation of the push buttons 56, 57 and 58. Likewise he can manually control the operation of the auxiliary equipment such as the crane 31 by the control switch 38. To operate the mechanism automatically the operator only has to press the button of the switch panel 42 corresponding to the station to which he wishes the carrier to deliver its load and then depress the button 56 to start the carrier in operation in a forward direction. The holding circuit of the contactor 48 will maintain the power supply circuit leading to the motor 8 until the holding circuit is broken when the collector shoe 24 reaches a dead section of the control bus bar 14 which will result in de-energizing the switch 46 and stopping the main drive motor 8 and simultaneously closing the circuit through contacts 50, energizing the contactor 69 and starting the operation of the auxiliary equipment, for example, starting the hoist 31 to lower the load carried thereby and deposit it on the floor.

After the auxiliary apparatus such as the hoist 31 has completed its cycle of operations the limit switch 71 is momentarily operated to close the circuit between the contacts 77 thus energizing the contactor 47 of the main control panel and causing the main drive motor 8 to be operated in a reverse direction until the trolley reaches the starting point where the shoe 25 will come into contact with the dead section 14a of the control bus bar, thus breaking the holding circuit of the reversing contactor 47 and cutting off the power supply to the main drive motor. The apparatus then is ready to be sent out on another trip.

The no-current relay 65 prevents automatic operation of the auxiliary equipment except when the shoe 24 is in contact with a dead section of the control bus bar 14 and shoe 25 is in contact with an energized section of the control bus bar. Thus the apparatus can be stopped and started manually without causing the auxiliary equipment to go through its regular cycle of operations at any place on the track except at the selected destination.

From the foregoing description of a preferred form of my invention it will be seen that my control apparatus operates efficiently to carry out a desired sequence of operations of the tractor and the auxiliary equipment. The apparatus is arranged so that only a single control bus bar need be employed and the various switches and contactors required can all be of standard and dependable construction. The apparatus is simple, efficient and fool-proof in operation.

Various changes and modifications can be made in my invention without departing from the spirit and scope thereof. It is to be understood, therefore, that my patent is not limited to the preferred form of my invention described herein or in any manner other than by the scope of the appended claims.

We claim:

1. In an electrified monorail system, a track, a motor driven trolley mounted on said track, a plurality of conductors extending substantially continuously along said track for supplying electrical current to said trolley, a separate control conductor extending along said track for completing a control circuit to said trolley, said control conductor having a section thereof insulated from the remaining portion of said conductor, switch means for opening the circuit leading to said insulated section and means for controlling said trolley mounted on said trolley and arranged automatically to stop said trolley and permit said trolley to remain stopped for an appreciable period of time when said trolley reaches the insulated section of said control conductor.

2. In an electrified monorail system, a track, a motor driven trolley mounted on said track, a plurality of conductors extending substantially continuously along said track for supplying electrical current to said trolley, a separate control conductor extending along said track for completing a control circuit to said trolley, said control conductor having a section thereof insulated from the remaining portion of said conductor, switch means for opening the circuit leading to said insulated section and thereby de-energizing said section and electrically controlled switch means mounted on said trolley for controlling said trolley and arranged to stop said trolley when said trolley reaches the de-energized insulated section of said control conductor.

3. In an electrified monorail system a track, a motor driven trolley mounted thereon, conductors extending substantially continuously along the track for supplying power to said trolley, a separate conductor extending along the track for completing a control circuit to said trolley and having a plurality of insulated sections, switch means for selectively de-energizing any one of said insulated sections, switch means carried by said trolley for controlling the operation of the driving motor thereof, said switch means including a holding circuit energized by said control circuit conductor whereby said holding circuit is broken when said trolley reaches a de-energized section of said control conductor thus opening said switch means and stopping the drive motor of said trolley.

4. In a monorail system, a track, a motor driven trolley mounted thereon, means for supplying electrical energy to said trolley, an electrically operated auxiliary mechanism propelled by said trolley, control means for controlling said trolley whereby said trolley may be started and automatically stopped for an appreciable period of time at a selected destination, control means for said auxiliary mechanism adapted automatically to initiate the operation of said auxiliary mechanism upon automatic stopping of said trolley, means for controlling said auxiliary mechanism to cause it to go through a cycle of operations, means for actuating said control means for said trolley for operating said trolley in a reverse direction automatically upon completion of the cycle of operations of said auxiliary mechanism, and means for automatically stopping said trolley when it reaches its starting point.

5. In a monorail system, a track, a motor driven trolley mounted thereon, means for supplying electrical energy to said trolley, an electrically operated auxiliary mechanism propelled by said trolley, automatic control means for controlling said trolley whereby said trolley may be started and automatically stopped for an appreciable period of time at a selected destination, control means for said auxiliary mechanism adapted automatically to initiate the operation of said auxiliary mechanism upon stopping of said trolley at the selected destination, manually operated control means for stopping said motor driven trolley, and means for preventing automatic operation of said auxiliary mechanism except when said trolley is stopped at its selected destination.

6. In an electrified monorail system having a track, a motor driven trolley mounted thereon, an electrically operated auxiliary mechanism propelled by said trolley, and conductors extending substantially continuously along the track for supplying power to said trolley and said auxiliary mechanism throughout substantially the entire extent of the track, a separate control conductor extending along the track for completing a control circuit to said trolley and having a plurality of insulated sections, switch means for selectively de-energizing any one of said insulated sections, switch means carried by said trolley for controlling the operation of the driving motor thereof, said switch means on said trolley including a holding circuit energized by said control circuit conductor whereby said holding circuit is broken when said trolley reaches a de-energized section of said control conductor thus opening said switch means on said trolley and stopping the drive motor of said trolley, means for controlling said auxiliary mechanism to cause it to go through a cycle of operations upon such stopping of said drive motor, and means for actuating said control means for said trolley to again start said trolley upon completion of the cycle of operations of said auxiliary equipment.

7. In an electrified monorail system a track, a motor driven trolley mounted thereon, an electrically operated auxiliary mechanism propelled by said trolley, conductors extending substantially continuously along the track for supplying power to said trolley and said auxiliary mechanism throughout substantially the entire extent of the track, a separate control conductor extending along the track for completing a control circuit to said trolley and having a plurality of insulated sections, switch means for selectively de-energizing any one of said insulated sections, switch means carried by said trolley for controlling the operation of the driving motor thereof and arranged to stop said driving motor when said trolley reaches a de-energized section of said control conductor thus opening said switch means and stopping the drive motor of said trolley, means for controlling said auxiliary mechanism to cause it to go through a cycle of operations upon such stopping of said drive motor and means for actuating said control means for said trolley to again start said trolley upon completion of the cycle of operations of said auxiliary equipment.

8. In an electrified monorail system a track, a motor driven trolley mounted thereon, an electrically operated auxiliary mechanism propelled by said trolley, conductors extending substantially continuously along the track for supplying power to said trolley and said auxiliary mechanism throughout substantially the entire extent of the track, a separate control conductor extending along the track for completing a control circuit to said trolley and having a plurality of insulated sections, switch means for controlling the energization of said insulated sections, switch means carried by said trolley for controlling the operation of the driving motor thereof, said switch means on said trolley being controlled by the energization of said control conductor whereby said switch means may be opened at any selected section of said control conductor to stop the drive motor of said trolley, means for controlling said auxiliary mechanism to cause it to go through a cycle of operations upon such stopping of said drive motor.

9. In an electrified monorail system a track, a motor driven trolley mounted thereon, conductors extending substantially continuously along the track for supplying power to said trolley throughout substantially the entire extent of the track, a separate control conductor extending along the track for completing a control circuit to said trolley and having a plurality of insulated sections, switch means for selectively de-energizing any one of said insulated sections, automatic electrically operated switch means carried by said trolley for controlling the operation of the driving motor thereof, and arranged to stop the drive motor of said trolley when said trolley reaches a de-energized section of said control conductor, and manually operable switch carried by said trolley means for starting or stopping said trolley at any time.

FRANK C. HARRIS.
CARROL DeV. MILLER.